Patented Sept. 20, 1949

2,482,606

UNITED STATES PATENT OFFICE 2,482,606

POLYALLYL NAPHTHENATE

David E. Adelson and Hans Dannenberg, Berkeley, Calif., assignors to Shell Development Company, San Francisco, Calif., a corporation of Delaware No Drawing. Application October 13, 1947, Serial No. 779,650

12 Claims. (Cl. 260—468)

This invention relates to a process for polymerizing unsaturated alcohol esters of naphthenic acid. More particularly, the invention is concerned with polyallyl naphthenate and a method for manufacture thereof.

Naphthenic acids are a distinct class of acids derivable from petroleum. They are saturated monocarboxylic acids containing a cyclopentane ring which has a plurality of alkyl groups linked thereto. Methods for obtaining the acids from petroleum and a description of their constitution is given in a book by Sachanen, "The Chemical Constituents of Petroleum," 1945.

According to the process of our invention, polymerization of a beta,gamma-monoolefinic monohydric alcohol ester of naphthenic acid is effected by heating the ester in the presence of a polymerization catalyst containing an oxygen atom linked directly by a chemical bond to another oxygen atom. In this manner, the useful polymer of the unsaturated alcohol ester of naphthenic acid is obtained.

Although it is preferred to polymerize allyl naphthenate, polymerization may be effected with naphthenic acid esters of other beta, gamma monoolefinic monohydric alcohols such as methallyl, crotyl, ethallyl, tiglyl, chlorallyl, 2-pentenyl, 2-hexenyl, 2-octenyl, 2-decenyl, cinnamyl, alphaphenyl allyl, and the like. In general, it is preferred to employ the ester of an alcohol which contains from 3 to 6 carbon atoms, and also one containing a vinylidene group linked directly to the carbinol group—e. g., allyl alcohol or methallyl alcohol. It is also preferred that the ester be from an alcohol containing only the elements carbon, hydrogen and oxygen.

The grade of naphthenic acid employed for the ester which is polymerized will depend upon the use intended for the polymer. For example, polyallyl naphthenate from naphthenic acid of acid number 200-300 is a viscous oil very suitable as a lubricant in that the polymer has a viscosity index of about 100 to 125 and a low pour point of about —25° C. If the polyallyl naphthenate is intended for use as an ester gum substitute, there is employed naphthenic acid of lower acid number such as from about 100 to 200.

The unsaturated alcohol esters of naphthenic acid are prepared by esterifying the unsaturated alcohol with naphthentic acid in like manner to that used for esterification of the unsaturated alcohols with other monocarboxylic acids. For instance, naphthenic acid is mixed with 50 to 100% stoichiometric excess of the unsaturated alcohol and benzene is added as azeotropic agent along with about 1 to 3% of p-toluenesulfonic acid as esterification catalyst. The mixture is refluxed with removal of the formed water of reaction as distillate. Upon completion of the esterification, the more volatile constituents such as benzene and excess unsaturated alcohol are distilled from the reaction mixture which is then washed with a dilute aqueous solution of a weak base such as sodium bicarbonate. The resulting crude naphthenate ester is then purified by distillation in vacuo. Owing to the tendency of the beta-substituted unsaturated alcohols, such as methallyl alcohol, to undergo rearrangement in the presence of acidic esterification catalysts, it is preferred to prepare the naphthentic acid esters of these alcohols by subjecting methyl naphthenate to alcoholysis with the unsaturated alcohol. Methyl naphthenate is mixed with excess of the beta-substituted alcohol and about 1 to 3% sodium methylate as catalyst. The mixture is refluxed and the liberated methyl alcohol distilled therefrom. When methyl alcohol no longer appears as distillate, the excess unsaturated alcohol is removed by distillation and the crude ester is washed with water to remove the catalyst after which the ester is purified by distillation in vacuo. The naphthenic acid esters of all the unsaturated alcohols with which the invention is concerned may be prepared by this latter method, if desired.

By heating the naphthenic acid ester of a beta, gamma-monoolefinic monohydric alcohol in the presence of the polymerization catalyst at a temperature of about 100° C. to 300° C., the ester is converted to polymer. The polymerization is very slow at the lower portion of the range since the naphthenate esters are quite difficult to polymerize. It is therefore preferred to effect the polymerization at about 140° C. to 250° C. where the rate of polymerization occurs at a more feasible rate. Excellent results are obtained at about 190° C. to 230° C.

It is essential that a polymerization catalyst be present during the heating in order to effect the desired polymerization. For this purpose, there is used a polymerization catalyst consisting of a compound containing an oxygen atom linked directly to another oxygen atom. Typical members of the class include benzoyl peroxide, lauroyl peroxide, hydrogen peroxide, acetylbenzoyl peroxide, tertiary butyl perbenzoate, tetralin peroxide, olefin peroxides, acetone peroxide, di(tertiary butyl) peroxide, tertiary butyl hydroperoxide, potassium perborate, and ammonium persulfate as well as gases like ozone, oxygen, air, or oxygen in admixture with other inert gases like methane, carbon dioxide or nitrogen. In using a non-gaseous compound as catalyst, about 0.1 to 5% is suitable with good results being obtained with about 2%. The whole amount of catalyst may be mixed with the ester at the start of the polymerization, or the catalyst may be added in increments from time to time during the course of the polymerization which is slow at best and requires heating for a number of hours. When a gaseous compound is employed as catalyst such as air or pure oxygen, the gas is kept in the dispersed presence of the ester by being bubbled or passed through the heated ester in a finely divided state so as to keep the catalyst in intimate contact with the polymerizing ester.

As a mass of the unsaturated alcohol ester of naphthenic acid polymerizes, the refractive index of the polymerizing mixture increases owing to the fact that the polymer like other polymers generally has a higher index of refraction than the monomer. This increase affords a ready method for determining the extent of polymerization at any time. The rate of increase is linearly related to the proportion of polymer present in admixture with its monomer. For any given unsaturated alcohol ester of naphthenic acid, fixed conditions of temperature and polymerization catalyst are chosen and the polymerization is conducted for an arbitrary time with determination of the refractive index at the start and finish. The reaction mixture is then subjected to distillation in vacuo after removal or destruction of the catalyst, and the unpolymerized monomeric ester is separated from the undistillable polymer so as to determine the proportion of polymer formed. The increase of refractive index which occurred is then correlated linearly with the proportion of polymer formation. The extent of polymer formation is readily ascertainable during subsequent polymerization of the naphthenic acid ester under the same polymerizing conditions from determination of the refractive index at any time.

The process of polymerizing the unsaturated alcohol ester of naphthenic acid is executed so that the ester is in liquid phase while polymerizing. Most of the esters utilized in the process of the invention will be liquids by themselves at the polymerizing temperature. In those cases where the ester has a higher melting point than the polymerizing temperature, sufficient solvent such as toluene is added so that the solution of ester will be liquid at the operating temperature. The polymerization is preferably conducted for a time sufficient to effect substantial polymerization of the ester—i. e., about 15% and upwards of conversion to polymer. Use of conversions of 50% to 80% are particularly suitable. The time necessary to reach such conversions will vary from several hours to a number of days depending upon the particular ester, the temperature and catalyst. It is ordinarily not necessary nor preferred to continue the polymerization until there is complete conversion to polymer because the polymer by itself is so viscous that agitation and heating of the reaction mass becomes inefficient as nearly complete conversion to polymer is approached.

The polymers of the invention have a degree of polymerization of about 4 to 20. In general, the degree of polymerization will be dependent upon the polymerization temperature with the highest degree being obtained at the lowest temperature. Polymers having a degree of polymerization of from about 5 to 10 are very suitable. At ordinary temperatures, the polymers of the invention are viscous liquids to soft plastic solids.

For the purpose of illustrating some details of the invention, the following examples are given:

Example I

Allyl naphthenate boiling at about 78° C. to 140° C. at 1 mm. of Hg pressure was prepared from naphthenic acid having an acid number of about 290. Two portions of the allyl naphthenate were polymerized by heating at 125° C. for 12 hours. One portion had about 2% benzoyl peroxide present as polymerization catalyst while a slow stream of air was bubbled through the second for this purpose.

Although polymerization is appreciable at this temperature and time, the temperature was low for the time allotted. The use of more preferred conditions is shown in the examples below.

Example II

Allyl naphthenate boiling at 105° C. to 112° C. at 0.4 mm. of Hg pressure and having the naphthenic acid therein with an acid number of about 260 was prepared.

The ester was polymerized by heating at 195° C. to 210° C. for 6.5 hours in the presence of about 2% of added di(tertiary butyl) peroxide. The treatment caused the refractive index (20/D) to increase about 0.0146 unit. Rapid distillation of the mixture at 0.2 mm. to 300° C. removed the unpolymerized monomer and showed that there had been a conversion to polymer of about 51%. The polyallyl naphthenate was a very viscous liquid. Measurement of its molecular weight indicated a degree of polymerization of about 4.

Example III

Allyl naphthenate boiling at 195° C. to 255° C. at 0.8 mm. of Hg pressure was prepared wherein the combined naphthenic acid had an acid number of about 165.

The ester was polymerized by heating at 140° C. to 150° C. for about 107 hours during which time about 3.5% of di(tertiary butyl) peroxide was added in six increments. The refractive index of the reaction mixture increased 0.0165 unit (20/D) and recovery of the polyallyl naphthenate indicated the conversion was 59%. The polymer had a degree of polymerization of about 5.4.

In like manner, the naphthenic acid esters of the other unsaturated alcohols noted hereinbefore are converted to polymer according to the process of the invention.

This application is a continuation-in-part of our copending application, Serial No. 417,278, filed October 31, 1941, which has become abandoned.

We claim as our invention:

1. A process for the production of polymer of a naphthenic acid ester of a beta,gamma-monoolefinic monohydric alcohol which comprises heating said ester in liquid phase at a temperature of 100° C. to 300° C. in the presence of a polymerization catalyst containing an oxygen atom linked directly to another oxygen atom.

2. A process for production of polymer of a naphthenic acid ester of a monoolefinic alcohol containing a vinylidene group linked directly to the saturated carbon atom of the carbinol group which comprises heating said ester in liquid phase at a temperature of 190° C. to 230° C. in the presence of a polymerization catalyst containing an oxygen atom linked directly to another oxygen atom.

3. A process for production of polyallyl naphthenate which comprises heating allyl naphthenate in liquid phase at a temperature of 100° C. to 300° C. in the presence of a polymerization catalyst containing an oxygen atom linked directly to another oxygen atom.

4. A process for production of polymethallyl naphthenate which comprises heating methallyl naphthenate in liquid phase at a temperature of 100° C. to 300° C. in the presence of a polymerization catalyst containing an oxygen atom linked directly to another oxygen atom.

5. A process for production of polyallyl naphthenate which comprises heating allyl naphthenate in liquid phase at a temperature of 100° C. to 300° C. while bubbling air through said heated ester.

6. A process for production of polyallyl naphthenate which comprises heating allyl naphthenate in liquid phase at a temperature of 100° C. to 300° C. in the presence of a peroxide polymerization catalyst.

7. Homopolymer of a naphthenic acid ester of a beta,gamma-monoolefinic monohydric alcohol, said polymer having a degree of polymerization of about 4 to 20.

8. Homopolymer of a naphthenic acid ester of an unsaturated alcohol of 3 to 6 carbon atoms containing a vinylidene group linked directly to the saturated carbon atom of the carbinol group, said polymer having a degree of polymerization of about 4 to 20.

9. Polymethallyl naphthenate having a degree of polymerization of about 4 to 20.

10. Polyallyl naphthenate having a degree of polymerization of about 4 to 20.

11. Polyallyl naphthenate of naphthenic acid having an acid number of about 290, said polymer having a degree of polymerization of about 4.

12. Polyallyl naphthenate of naphthenic acid having an acid number of about 100 to 200, said polymer having a degree of polymerization of about 5 to 10.

DAVID E. ADELSON.
HANS DANNENBERG.

REFERENCES CITED

The following references are of record in the file of this patent:

UNITED STATES PATENTS

| Number | Name | Date |
|---|---|---|
| 2,209,198 | Frolich | July 23, 1940 |